United States Patent Office 3,174,211
Patented Mar. 23, 1965

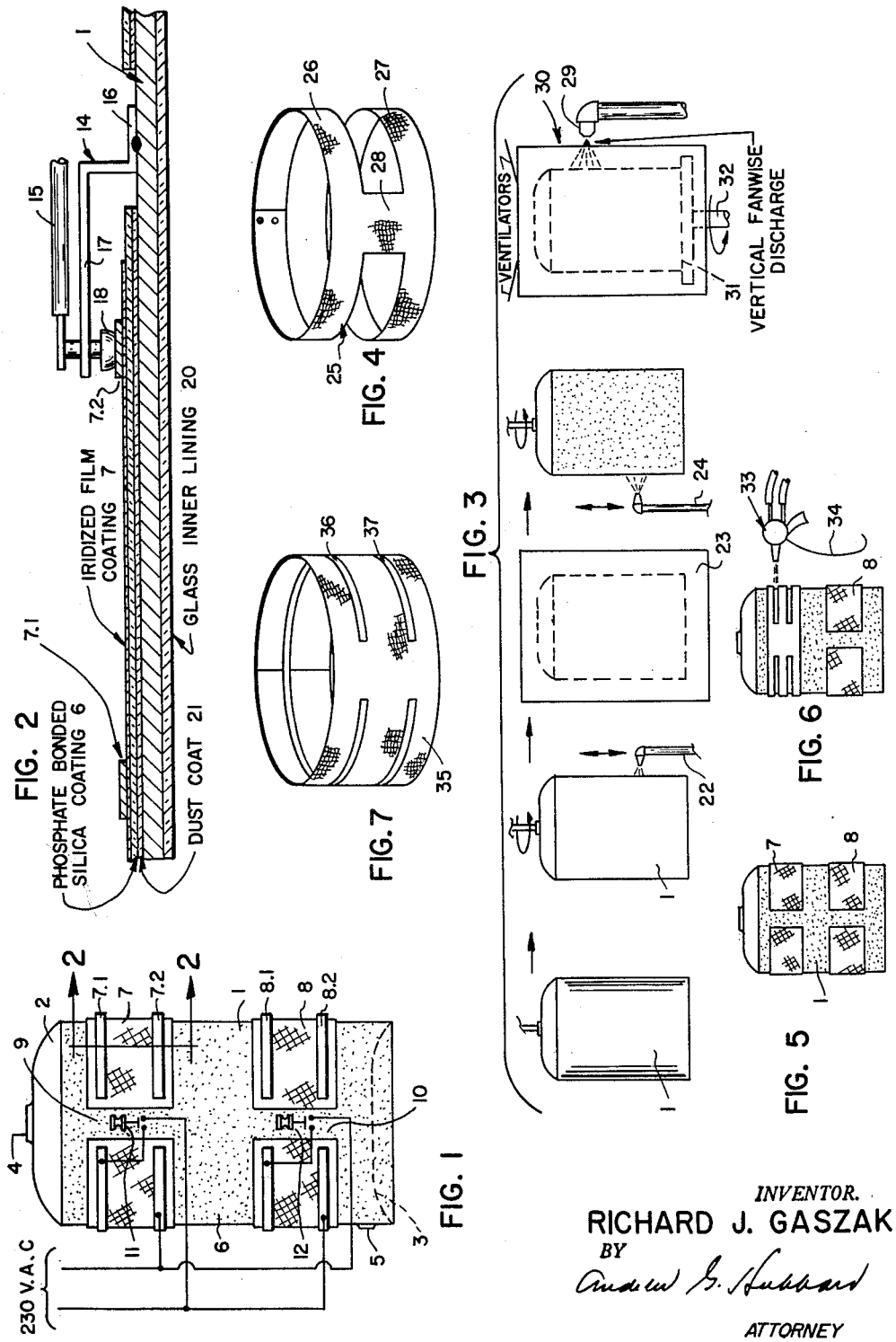

3,174,211
METHOD OF MANUFACTURING A RESISTANCE-HEATING TYPE WATER HEATER
Richard J. Gaszak, Willow Springs, Ill., assignor to General Electric Company, a corporation of New York
Filed July 26, 1961, Ser. No. 126,910
2 Claims. (Cl. 29—155.5)

This invention relates to storage water heaters of the electric resistance heating type, and in particular, to water heaters and the method of manufacture thereof in which the heating element comprises an oxide film applied to the exterior of the storage tank.

Prior to the present invention, resistance heatnig elements for water heaters of the storage type were either immersion heaters in which a metallic sheathed heating unit is passed through a tank wall opening and is in direct contact with the water in the tank, or of the type having a heating element clamped about the exterior of the tank to heat the water therein by conduction through the tank wall. Literally millions of water heaters using these forms of heating elements are in satisfactory daily use in water heaters in which the tank is of galvanized steel. The market is trending from galvanized tanks to those having a "glass" lining, that is, a lining comprising a glass-forming frit applied to the interior of the tank by spraying or equivalent means and fired in a suitable furnace to fuse the frit into a glass which bonds to the tank. It is generally accepted in the industry that the external clamp-on units are not satisfactory for glass-lined tanks because the transfer of the heat is concentrated at a small surface area, leading to substantial temperature gradients with respect to the glass lining and the water in contact therewith; the resultant inequalities of expansion and contraction appear conducive to the failure of the glass lining and exposure of the metal of the tank. Immersion units, on the other hand, are deficient only in the sense that protection of the tank wall against electro-chemical corrosion caused by the existence of minute "holidays" in the glass lining can establish a condition in which the sheath of the immersion heating element may be eroded to the point of complete failure of the heating element. This requires that immersion heating elements be equipped with special protection means as disclosed, for example, in Dicome U.S. Patent 2,810,815 granted October 22, 1957, for "Electric Heaters."

I have found that an electric resistance film of the metallic oxide type or, more broadly stated, of the electroconductive iridized film type, is ideally suited for glass-lined water heaters, for it can be applied to obtain a wattage density which will require the film to be rather widely distributed over the exterior of the tank and therefore unproductive of localized hot spots which are typical of the clamp-on resistance type. Being external, such films are not subject to electro-chemical corrosion problems. However, such films are applied at high temperatures, and electrical insulation and other factors require that the films be applied to a smooth, dense, glass-like substrate. Insofar as I am aware, it has hitherto been considered impractical to apply a glass coating on the exterior wall of the tank of the glass-lined type because occluded gases which escape from the metal, subsequent to the firing of the glass frit, can result in a failure of portions of the inner lining where the gas, in attempting to escape, may fracture the glass to produce what is known in the art as "fish scaling." In view of the fact that the interior of the storage tank is unavailable for inspection when the tank is in service, the possibility of fish scaling of the inner lining cannot be tolerated.

I have found that by applying to the exterior wall of the tank what is known in the art as a "dust coat"—a coating of glass frit material applied so lightly that it will not form a dense or substantially impervious glaze when fired—I can provide a base to which a phosphate-bonded silica may be applied and fired without any danger of fish scaling or other damage to the dust coat or to the interior glass lining. The dust coat has a matte surface to which the phosphate-bonded silica will adhere strongly; and yet the dust coat will protect the mild steel tank against etching or other attack by the phosphoric acid vehicle of the substrate.

Following these and subsequent practices later described, the electrical resistance film is applied to the substrate and terminal bands affixed thereto for the attachment of power leads; whereupon the storage tank is in condition for the addition of thermostats, thermal insulation and protective outer casing.

It is an object of the present invention therefore to provide a resistance-heated storage type water heater, and the means for manufacturing the same, in which a resistance film is applied to a substrate material which is electrically insulating and thermally conducting.

Other features and advantages of the invention will be apparent from the following detailed description of a presently preferred form and method of manufacture thereof, read in connection with the accompanying drawing in which:

FIG. 1 is a schematic side elevation of a water heater without its thermal insulation and outer casing, to show the arrangement of the resistance films and the terminal bands;

FIG. 2 is a section taken through 2—2 of FIG. 1 showing the coatings applied to the base metal of the tank. (It should be understood that with respect to the insulating and resistance film coatings, particularly, the thicknesses are greatly exaggerated);

FIG. 3 is a composite schematic representation of stages in the manufacture of the water heater;

FIG. 4 is a perspective representation of a masking device useful in delineating the areas over which the film of electrical resistance material is to be applied;

FIG. 5 is a front elevation of a tank after the application of the resistance films;

FIG. 6 is a schematic representation of a method of applying the terminal strips to the resistance film; and FIG. 7 is a perspective of a mask useful in delineating the terminal bands.

FIG. 1 represents a storage type water heater with upper and lower external resistance elements and thermostats individual to the resistance elements. The area comprehended by the resistance coatings and the location and arrangement of the thermostats are illustrative only and are not to be viewed in a limiting sense. The storage tank 1 is a conventional mild steel tank capable of withstanding hydraulic test pressures of the order of 300 pounds per square inch pursuant to present-day standards; it has a top head 2 and a bottom head 3 welded to the cylindrical body portion which may be formed by rolling sheet steel stock and having a longitudinal welded seam (not shown). The upper and lower spuds 4, 5 are respectively for the attachment of hot water outlet piping and cold water inlet piping (not shown) as is well known in the art. The exterior wall of the tank is coated with a ceramic-like material which is electrically insulating and thermally conducting. In FIG. 1 said material is represented by the lightly stippled area 6. On said electrically insulating coating there are applied upper and lower areas or bands 7, 8 of a resistance film represented by the diagonal cross hatching. It will be noted that said bands comprehend almost the complete periphery of the tank; there are provided, for example, areas 9, 10 which may be of the order of three to four inches in peripheral width to accommodate the respective thermostats 11, 12. Said thermostats have been schematically shown and may be of any conventional bimetallic or hydraulic type with appropriate means (not shown) for adjusting operation for temperature and amplitude. It will be understood that although said areas 9 and 10 are devoid of the resistance film, they may have the coating 6 of the electrically insulating material. Each of the resistance films has applied thereto the upper and lower electric terminal bands 7.1 and 7.2 and 8.1 and 8.2 which may be aluminum, applied by flame-spraying or other conventional means later described. At appropriate locations the tank is provided with connection terminals 14 to accommodate the power wiring 15. By way of illustration only, FIG. 2 shows one such terminal, representing it as an angular device having a base 16 welded to a bare metal area of tank 1 and a resilient extension 17 insulatedly mounting a contact 18 to which the lead wire 15 may be attached. Said terminal contact may comprise a button-headed aluminum device. By inherently biasing the extension 17 in the direction of the tank, the terminal is readily maintained in suitable pressure engagement with its associated terminal band.

Referring now to FIG. 3, it will be assumed that the tank 1 is complete in its preliminary stage; that is, it is assumed to have completed the manufacturing operations which have produced the permanent glass inner liner 20 and the exterior coat 21. As presently explained, the coat 21 is what is known in the art as a "dust" coat. The materials of the respective coats 20 and 21 may be identical, being of any conventional proprietary water heater glass frit such as the No. 2505 water heater frit manufactured and sold by Ferro Corporation of Cleveland, Ohio. Such glass frits contain silica, borax, feldspar and alumina, as is well known in the art. However, whereas the inner lining 20 is relatively thick and the frit is applied in amounts required to produce a dense, glassy lining, affording desired corrosion-protection for the mild steel of the tank body, the dust coat 21 has such a light application of frit that on firing, the coating has a dull, even, appearance, rather than a glassy coating. This dust coat can also be described as having a "matte" finish. The dust coat frit is applied in a weight of only about 5 grams per square foot whereas the inner lining frit is applied in a weight of several times that amount. In these preliminary manufacturing operations the top head 2 is welded to the cylindrical body portion of the tank. This sub-assembly is chemically cleaned for the removal of grease and other contaminants and then the inner surface is further cleaned and mechanically prepared for the reception of the frit by grit-cleaning or blasting by conventional means. Similar cleaning and mechanical preparation is performed on the exterior cylindrical surface of the tank. The frit of the interior lining and of the dust coat is sprayed on at the previously noted density. The inner and outer coatings are applied in a single-stage operation by conventional apparatus. The bottom head is also made ready and sprayed with frit at the "lining" density, whereupon the sub-assembly and the bottom head are fired at a temperature of about 1500 degrees F. in a suitable furnace and atmosphere. Following this, the bottom head is inserted into the lower portion of the cylindrical tank and is welded thereto by conventional means. It has been noted that it is of great importance to have the fired dust coat in a final state in which it is not a smooth, glassy film which would actually seal the exterior of the tank. During the firing of the frit appreciable amounts of hydrogen are liberated; it appears that the gas evolves from the water content of the frit, as applied, and probably from residual acid from earlier pickling operations. Hydrogen is also in solution in the steel. In any event, it becomes trapped in the steel by the vitrifying frit. It will, however, eventually escape; and if the outer surface of the tank were sealed as the inner surface must be, the inevitable result would be the surface failure known in the art as "fish scaling." This condition may occur a substantial and unpredictable time after the tank is completed and is in actual service. Obviously, a potential fault of this kind cannot be tolerated. Imperfections of the glass lining on the inner wall would expose the base metal to the corrosive attack of water when the water heater is placed in service; and external imperfections could provide a short circuiting path from the resistance film to the grounded tank.

It is a principal function of the dust coat 21 to afford a proper base for the electrically insulating coating next to be applied and to protect the metal of the tank from attack by said coating. Unless the insulating coating can be applied in an operation immediately following the firing of the dust coat, the tank 1 should be cleaned thoroughly with alcohol followed by a water rinse to remove any traces of dirt or oil from the dust coat. There is then applied a phosphate-bonded silica substrate 6 by means of any conventional spray equipment 22. The application is sufficient to produce a wet weight of approximately 65 grams per square foot. This will produce a dried thickness of about 12 mils.

A presently preferred formulation for the substrate 6, expressed in terms to indicate the relative proportions, is as follows:

400 grams 140 mesh silica
50 grams 145 mesh air ground mica
30 grams Al(OH)$_3$—325 mesh
60 cc.'s 85 percent phosphoric acid
9 grams bentonite
220 cc.'s de-ionized water The water and acid are mixed and allowed to cool, after which the components are ball milled for 30 minutes.

This material is sufficiently liquid to permit application by the schematically shown spray head 22, which may be vertically reciprocated while the tank is rotated slowly by any suitable mechanical means. The next manufacturing stage comprises heating the tank and substrate coating in a suitable furnace 23 at a temperature of about 650 degrees F. for about 30 minutes. The furnace atmosphere is unimportant. Upon cooling the tank to room temperature, preferably by normal heat loss to the atmosphere after removing the tank from the furnace, the substrate 6 will be found to be a mechanically strong adherent coating. It is then desirable to buff the surface of the substrate lightly using, for example a 3/0 emery paper and to seal the substrate by applying a sealing solution. This solution may be applied in the open by means of a spraying apparatus 24 which is vertically reciprocated as the tank is rotated. The sealing solution permeates the pores of the substrate and perfects it as an electrical insulation.

A presently preferred sealer formulation is as follows:

33 volumes ethyl alcohol
15 volumes Union Carbide Ethyl Silicate 40
2 volumes 1% HCl solution The HCl solution is prepared from 42.5 parts water to 1 part 37% hydrochloric acid. The 2 volumes of acid is mixed with 8 volumes of ethyl alcohol and added to the ethyl silicate with thorough mixing; after allowing approximately 2 hours for completion of the reaction the remaining 25 volumes of ethyl alcohol is added.

After the application of the sealer, the tank is heated to a moderate temperature, for example, 300 degrees F.

and permitted normally to cool to room temperature following which the surface is again lightly buffed to remove any loose silica.

The tank is now ready for the application of the electroconductive iridized coating. To assist in delineating the areas to which this coating or film is to be applied, it may be desirable to use a mask such as the mask 25, FIG. 4. This mask may advantageously be made of an asbestos cloth or other noninflammable flexible material and is formed to have the upper and lower bands 26, 27 connected in front by the rectangular panel 28. The bands may be provided with snap fasteners or equivalent to permit easy application and removal. With a band in place at desired upper and lower portions of the tank and the portions 28 in vertical alignment to provide the location areas for the thermostats 9 and 10, the tank is placed in a suitably ventilated furnace 30 and brought to a temperature of 1,000 degrees F. plus or minus 50 degrees. The tin film solution is applied by spraying through a suitable opening (not shown) in the side wall of the furnace while the tank is rotated. Advantageously, the bottom 31 of the furnace may comprise a turntable rotated at a desired rate by the suitably driven shaft 32. After spraying, the tank is permitted to cool to room temperature and the masks removed. The tank will then be as in FIG. 5.

The resistance film may be formulated as follows:

150 cc.'s ethyl alcohol
30 gms. stannic chloride
1 cc. 37% HCl containing 20% antimony trichloride The stock solution of ethyl alcohol and stannic chloride can be made in large batches and stored for long periods without deterioration. The antimony trichloride-acid solution is added just prior to spraying. Once again, the spraying apparatus, 31, has been schematically shown, but it is preferably of the type producing a vertical fan-shaped discharge, such as taught by Junge Patent 2,570,245, granted October 9, 1951 for "Method of Spraying Transparent Coatings." By appropriately relating the speed of rotation of the tank to the discharge pressure of the spray gun or guns, the coating can be applied in a film thickness providing a film resistance of approximately 9–10 ohms. The point-to-point resistance at 2-inch spacing following the film-spraying operation of a standard 40-gallon water heater tank was approximately 380 ohms.

It has been found that satisfactory terminal bands may be applied by metal-spraying techniques, using a conventional metallizing gun such as schematically illustrated at 33, FIG. 6, by means of which aluminum wire 34 is melted and projected by gas pressure onto the receiving surface. Once again it is advantageous to apply a mask, 35, FIG. 7, to properly delineate the terminal strips. The mask cutout portions 36 and 37 identify the length and width of the terminal strips which are positioned inwardly of the upper, lower and side margins of the tin oxide areas as shown in FIG. 1. It will be understood that if it appears expedient to provide enlarged areas of the terminal strips to accommodate the line terminals, the cutouts 36, 37, may be made to conform to the desired local configurations. It has been found that the application of sprayed aluminum terminal strips to a thickness of the order of 4 to 5 mils provides excellent electrical contact with the tin oxide film with minimal resistance loss along the terminal strips.

It will be obvious that the effective resistance area of the two tin oxide portions of the tank comprise that which is between the terminal bands of the respective areas. The total area of the respective bands therefore establishes the wattage rating of the water heater.

Following the application of the terminal bands and the terminals 14 to the tanks, the water heater may be completed by the application of conventional external insulation of mineral wool or the like and the application of an enclosing protecting cover (not shown).

Electrical data determined by test of a conventional 40-gallon glass-lined water heater tank manufactured according to the foregoing method, are as follows:

Wattage _____ 5750.
Voltage _____ 236.
Amperage _____ 24.4.
Film resistance _____ 9.68 ohms.
Insulation resistance _____ 10 plus megohms.
Maximum film temperature _____ 300° F.

While there has been described what is at present considered to be the preferred embodiment of the invention, it will be understood that various modifications may be made therein, and it is intended to cover in the appended claims all such modifications which fall within the true spirit and scope of the invention.

What is claimed is:

1. The method of manufacturing a storage-type water heater of the resistance-heating type, which includes the steps of: coating selected external areas of a ferrous metal pressure vessel with a finely-divided glass-containing material having a substantially uniform distribution approximating 5 grams per square foot of surface; heating said material to perfect the adherence thereof to said vessel while maintaining said material in gas permeable matte condition; applying to the said matte surface a coating of heat conducting and electrically insulating material comprising essentially a mixture of finely divided refractory material and phosphoric acid; firing said coating at a temperature between 500° F. and 1,000° F. to solidify said coating to produce an initially porous layer of the order of 12 mils thickness while avoiding vitrification of said glass-containing material; applying an electrically insulating sealant to said second named layer to permeate the pores thereof; forming on said second-named layer an electroconductive iridized film of electrically conductive material consisting primarily of tin oxide; and applying electrical conductor strips to said film for connection to electrical energy; the spacing of said strips one from the other being selected to provide a desired wattage rating.

2. The method of manufacture as set forth in claim 1 in which the heat conducting and electrically insulating material comprises, per unit of volume, 140 mesh silica in amounts of from 350 to 450 grams, 145 mesh air ground mica in amounts of from 40 to 60 grams; Al(OH$_3$) fines in an amount equalling about 60% of the quantity of mica, in a vehicle containing between 50 and 75 cc. of 85% phosphoric acid and between three and four times that quantity of deionized water.

References Cited by the Examiner

UNITED STATES PATENTS

| | | | |
|---|---|---|---|
| 1,870,619 | 8/32 | Flanzer | 219—44 |
| 2,510,456 | 6/50 | Biebel | 219—38.3 |
| 2,678,990 | 5/54 | Quirk | 219—34 |
| 2,742,561 | 4/56 | Flater | 219—38.3 |
| 2,801,321 | 7/57 | Prindle | 219—38.3 |
| 2,827,536 | 3/58 | Moore et al. | 29—155.7 |
| 2,828,218 | 3/58 | Zimmerman | 117—70 |
| 2,859,321 | 11/58 | Garaway | 219—34 |
| 2,864,721 | 12/58 | King et al. | 117—70 |
| 2,939,807 | 6/60 | Needham | 219—19 |
| 3,109,228 | 11/63 | Dyke et al. | 29—155.7 |

FOREIGN PATENTS 1,024,136   1/60   France.

OTHER REFERENCES

"Porcelain Panel That Heats a House," Popular Science Monthly, March 1958, pages 121, 122 and 123.

JOHN F. CAMPBELL, Primary Examiner.

MAX L. LEVY, ANTHONY BARTIS, Examiners.